United States Patent [19]

Kronberg

[11] Patent Number: 5,722,290
[45] Date of Patent: Mar. 3, 1998

[54] CLOSED-FIELD CAPACITIVE LIQUID LEVEL SENSOR

[75] Inventor: James W. Kronberg, Aiken, S.C.

[73] Assignee: The United States of America as represented by the United States Department of Energy, Washington, D.C.

[21] Appl. No.: 408,412

[22] Filed: Mar. 21, 1995

[51] Int. Cl.⁶ ............................................. G01F 23/26
[52] U.S. Cl. ...................... 73/304 C; 324/664; 324/690
[58] Field of Search .......................... 73/304 C; 340/620; 324/663, 664, 687, 688, 690, 667, 674, 681, 689

[56] References Cited

U.S. PATENT DOCUMENTS

| | | | |
|---|---|---|---|
| 3,283,577 | 11/1966 | Schuck | 73/304 C |
| 3,343,415 | 9/1967 | Johnston | 73/304 C |
| 3,831,069 | 8/1974 | Merrel et al. | 317/246 |
| 3,935,740 | 2/1976 | Whitney | 73/304 C |
| 4,003,259 | 1/1977 | Hope | 73/304 C |
| 4,176,553 | 12/1979 | Wood | 73/304 C |
| 4,194,395 | 3/1980 | Wood | 73/304 C |
| 4,470,008 | 9/1984 | Kato | 324/61 R |
| 4,518,956 | 5/1985 | Kitagawa et al. | 340/620 |
| 4,530,372 | 7/1985 | Overton et al. | 137/392 |
| 4,603,581 | 8/1986 | Yamanoue et al. | 73/304 C |
| 4,677,522 | 6/1987 | Persson | 73/304 C X |
| 5,315,884 | 5/1994 | Kronberg | 73/863.68 |
| 5,399,979 | 3/1995 | Henderson et al. | 73/304 C X |

FOREIGN PATENT DOCUMENTS

| | | | |
|---|---|---|---|
| 180916 | 10/1983 | Japan | 73/304 C |
| 223618 | 10/1986 | Japan | 73/304 C |

*Primary Examiner*—William A. Cuchlinski, Jr.
*Assistant Examiner*—Willie Morris Worth
*Attorney, Agent, or Firm*—Harold M. Dixon; William R. Moser; Paul A. Gottlieb

[57] ABSTRACT

A liquid level sensor based on a closed field circuit comprises a ring oscillator using a symmetrical array of plate units that creates a displacement current. The displacement current varies as a function of the proximity of a liquid to the plate units. The ring oscillator circuit produces an output signal with a frequency inversely proportional to the presence of a liquid. A continuous liquid level sensing device and a two point sensing device are both proposed sensing arrangements. A second set of plates may be located inside of the probe housing relative to the sensing plate units. The second set of plates prevent any interference between the sensing plate units.

20 Claims, 5 Drawing Sheets

1B

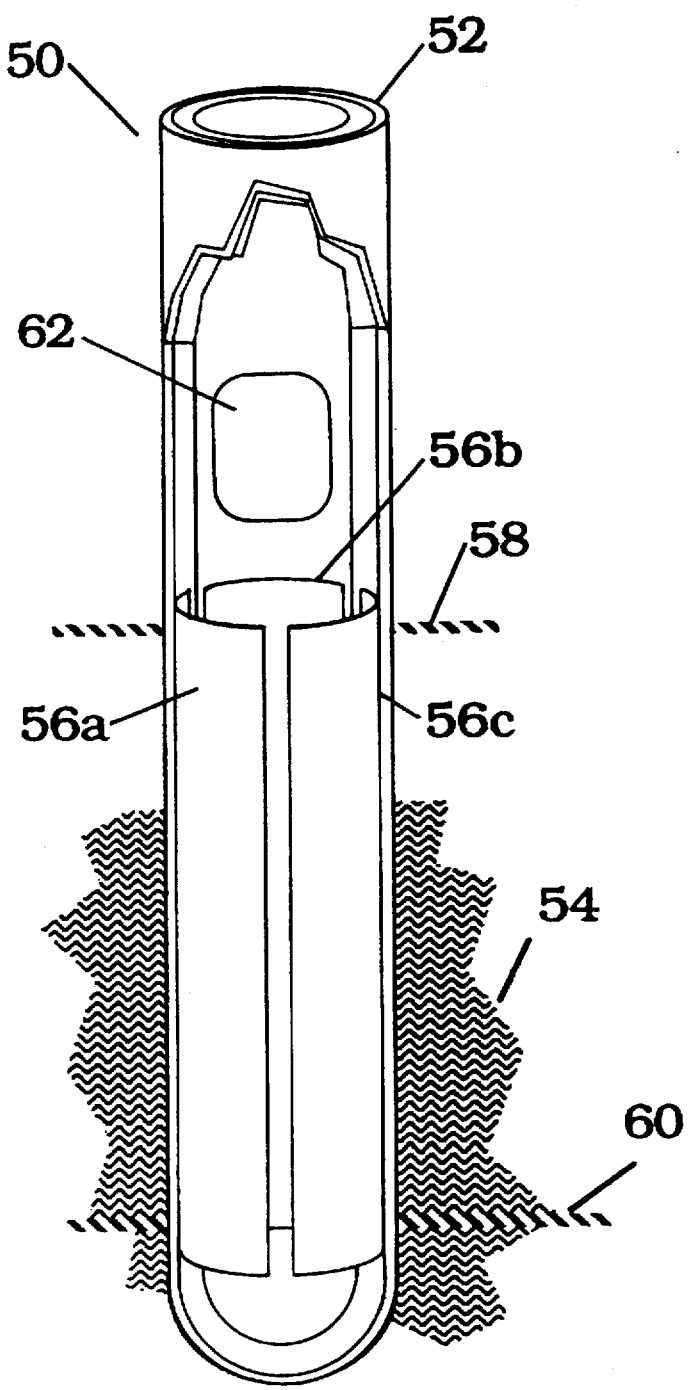

CLOSED-FIELD CAPACITIVE LIQUID LEVEL SENSOR

The United States Government has rights in this invention pursuant to Contract No. DE-AC09-89SR18035 between the United States Department of Energy and Westinghouse Savannah River Company.

BACKGROUND OF THE INVENTION

1. Field of the Invention

The present invention relates to an apparatus for detecting liquid level. In particular, the apparatus utilizes a closed field capacitive sensor. The apparatus utilizes a ring oscillator circuit and an odd number of plates distributed symmetrically. As a result, the sensor requires no ground reference and is virtually immune to external electromagnetic interference.

2. Discussion of Background

Liquid level and liquid presence detection are critical to a wide variety of processes, both in the chemical industry and elsewhere. A great many methods of sensing liquid level or presence have already been developed. These include devices which respond to electrical and thermal conductivity, capacitance, density and surface tension. Other devices also respond to chemical, optical and acoustic properties.

In certain conditions, such as extreme temperatures, with slurries, with highly corrosive or ultra-pure liquids, or with liquids which tend to coat the sensors, the above methods are unusable. Density methods, for example, usually employ movable floats which are carried up or down by the liquids to be sensed. Thermal sensing devices may not be useable with heat-sensitive materials such as pharmaceuticals, foodstuffs or specialty chemicals. Most electrical and chemical sensors require contact between liquids and potentially contaminating or corrosion prone materials. Sensors of complex form are difficult to clean and potentially carry contamination from one process stage to another. Liquids may also leak into sensor circuitry along the interfaces between sensor parts which often results in circuit failure or degraded response. In addition, many sensors are undesirably bulky.

An ideal liquid level or liquid presence detector would have no moving parts and would be completely sealed in a compact one piece housing of simple easily cleaned form made of inert material. Further, an ideal detector would work with virtually any liquid regardless of its density, electrical or optical properties, and would not add energy to the liquid in the form of heat or otherwise. Another desirable property would be simple interconnection between multiple sensing regions within a single housing, so that sensing could be performed at multiple points using a single probe. No such sensor is known to be available.

SUMMARY OF THE INVENTION

According to its major aspects this invention is an apparatus to detect liquid level by utilizing a capacitive sensor. The apparatus utilizes three or more flat or cylindrical plates or plate units, arranged symmetrically in combination with a ring oscillator to provide output signal pulses with a frequency inversely proportional to the capacitance between the plates or plate units.

Another object of the invention is to provide a sensor which requires no ground reference. This causes the sensor to be virtually immune to external electromagnetic interference.

Another object of the invention is to provide multiple sensing regions within a single housing so that sensing may be performed at multiple points in a single probe.

Another object of the invention is to provide the plates with isolation from the liquid.

Another object of the invention is to provide inner plates to shield the plates from effects caused by each other.

Another object of the invention is to include a dry noncondensable gas in the interior of the probe and inside of the sensing plates. This gas reduces the capacitance between the inner surfaces of the plates.

Another embodiment of the invention is to provide multiple plates for each plate unit which has the same function as an individual sensing plate.

A further preferred embodiment of the invention includes arranging the electrical circuitry for the device inside of the probe.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1B shows a ring oscillator circuit where the capacitors have a common node.

FIG. 7 shows a liquid level probe which continuously measures the depth of level of a liquid.

DETAILED DESCRIPTION OF A PREFERRED EMBODIMENT

This invention is based in part upon the ring oscillator circuitry set forth in U.S. Pat. No. 5,315,884 which issued on May 31, 1994 to James W. Kronberg and which is hereby incorporated by reference.

The above invention includes a sensor consisting of three or more flat plates arranged symmetrically and connected as capacitive timing elements in a ring oscillator made up of, for example, CMOS inverters. The output of the sensor takes the form of a variable frequency pulse train which decreases in frequency with increasing capacitance between the plates.

The ring oscillator drives the plates at different phase angles. Since the plates are arranged symmetrically, the sum of the instantaneous voltages around the circuit is approximately constant. Therefore, the sensor requires no ground reference and is virtually immune to external electromagnetic interference. The circuit detects objects which are not grounded and have little capacitive coupling to the surroundings. No real or virtual return current path is needed beyond that provided through the interaction of the sensor plates themselves. The closed or self sufficient nature of the sensing field around the plates is considered unique in the field of liquid level sensing.

Figure 1A:
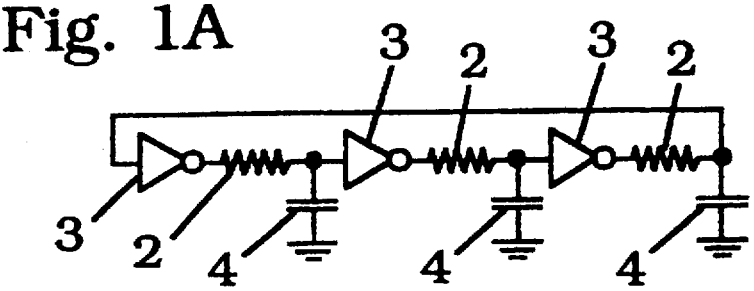
FIG. 1A shows a ring oscillator circuit with three gates.
Figure 1A:
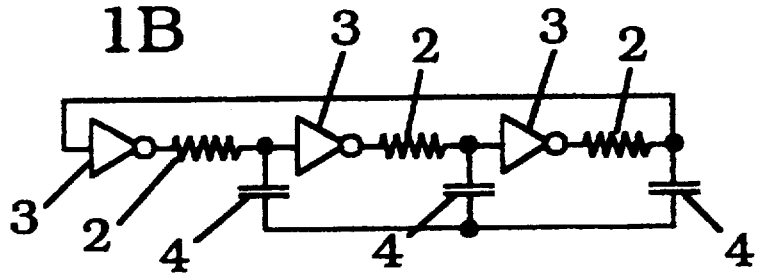

The sensor circuit of FIG. 1A comprises an odd number of 4049-type CMOS inverters or operational amplifiers 3, preferably three, each driving a series resistor 2, shunt capacitor 4 and the next gate of the ring oscillator so that a delay is introduced between the output transition of each gate and the input transition of the next gate. The three resistors have constant values and the three capacitors are formed by plates 4 which may exhibit varying degrees of capacitance with respect to each other. The oscillation frequency is inversely proportional to the capacitance of the plates 4. Other types of inverters may also be utilized to drive the gates.

The behavior of the oscillator is best described by first considering all the capacitors as being connected to ground as shown in FIG. 1A. Here the interstage delay D will be approximated by 0.48RC, and thus the oscillation frequency is 1/(1.44RC) where R is the value of resistance for element 2 and C is the capacitance value for the plate 4.

If the three capacitors are connected to a common node as shown in FIG. 1B, the oscillation takes place in the same way with little change in frequency. This is because the three capacitors transfer displacement currents which are equal but symmetrically distributed in phase, so that the common node takes on a voltage which remains nearly constant over time.

Figure 1C:
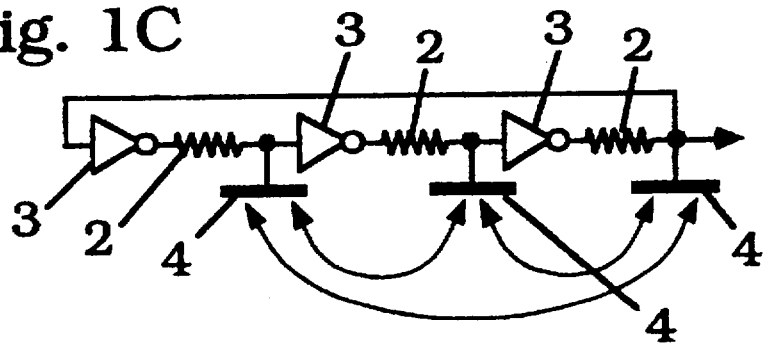
FIG. 1C shows a ring oscillator circuit having single plates instead of capacitors.

For use as a liquid level sensor, the oscillator circuit is modified by replacing each capacitor with a single plate, facing toward the region of interest as shown in FIG. 1C. If the space is empty, the capacitance seen by each plate will be that between it and the other two plates in a vacuum. This small capacitance value will give the circuit a high oscillation frequency. The field of displacement currents will extend outward from the plates by a distance determined by their geometry.

Figure 1D:
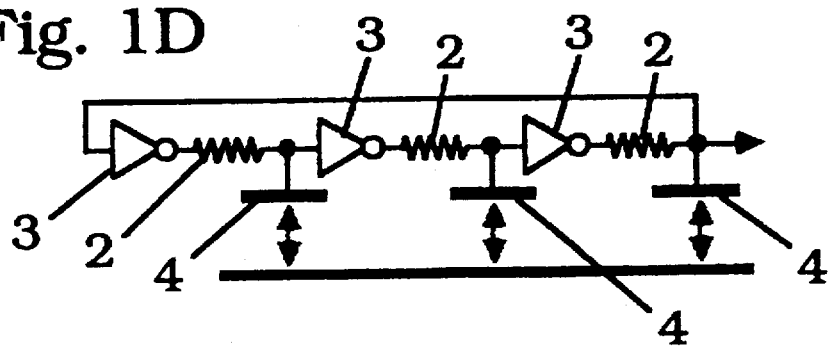
FIG. 1D shows the ring oscillator circuit of FIG. 1C with a body of electrically conductive material near the plates.

If a body of electrically conductive material is brought into the field of displacement currents an easier path is provided as shown in FIG. 1D. This causes the capacitance across the plates to increase and the oscillation frequency to lower. This will happen regardless of whether or not the conductive material is electrically floating or connected to some external ground. The conductive material does not need to be metal. Any substance having mobile electric charges will cause this effect. One example is dissolved ions in a liquid.

Figure 1E:
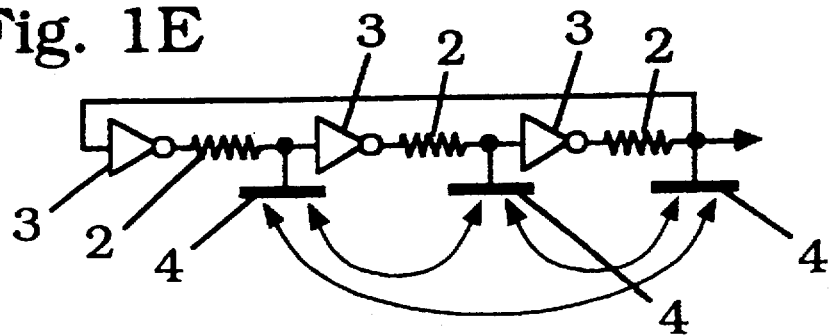
FIG. 1E shows the electrical effects when the ring oscillator circuit of FIG. 1C has a body of nonconductive material nearby the plates.

Similar effects will occur if a body of material which is electrically nonconductive, but possesses a dielectric constant higher than that of vacuum is placed in the field of displacement currents as shown in FIG. 1E. Nearly all solids and liquids have this property in varying degrees.

The most suitable shape for most liquid sensing applications comprises a smooth walled cylinder. This shape allows for insertion into a tank through a hole or pipe fitting of minimum diameter. This sensor should be able to detect the presence of a liquid at multiple points along its length or as an analog function over the entire length of the probe.

Figure 2A:
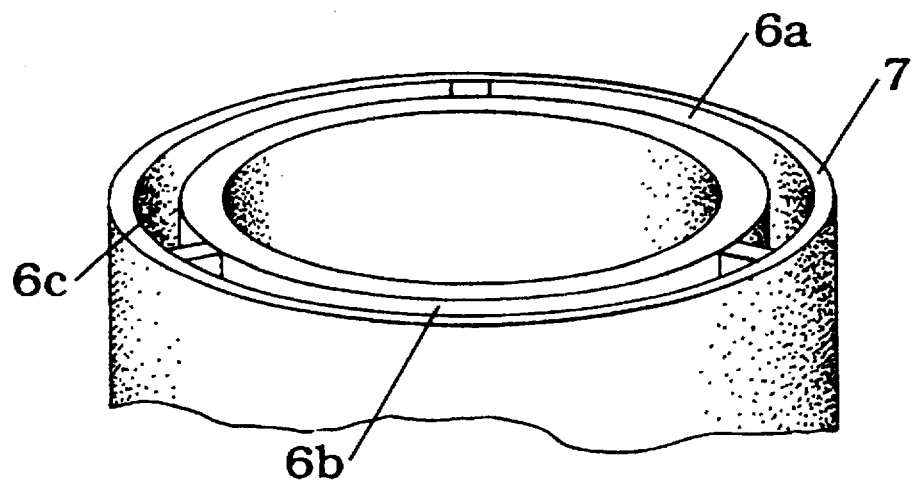
FIG. 2A comprises a first cylindrical sensing probe.

Such an arrangement is shown in FIG. 2A where the cylinder has plates or plate units 6a, 6b, 6c which take the form of segments each making up slightly less than one third of the cylinder's circumference with insulating gaps between the plates. A thin layer of nonconducting material forms an outer cylinder cover 7. This cover is preferably resistant to chemical attack and has a low dielectric constant. Suitable materials for this cover or layer include fluorinated polymers and more preferably a tetrafluoroethylene polymer which has a particularly low dielectric constant. A rigid inner cylinder is also nonconductive and of low dielectric constant. The inner cylinder lies within the plate units 6a, 6b, 6c and preferably has outward extensions filling the gaps between the plate edges. The cylinder cover 7 and inner cylinder may preferably comprise a single, integral element. This element may be formed of tetrafluoroethylene or polyvinyl chloride.

To reduce the capacitance between the inner surfaces of the plates, the inner cylinder is preferably hollow, sealed, and filled with very dry air or another dry, noncondensable gas. Examples of nonconductive gases which may be utilized with this invention include, but are not limited to, nitrogen, neon and argon. Therefore, the liquid being detected cannot enter the probe interior inside of the set of sensing plates and may only contact the probe on the outside of the sensing plates.

As described earlier, the three plates are connected as capacitive plates 6 in a ring oscillator. With the probe dry, the oscillating frequency is determined mainly by the capacitance between each plate unit and the other two plate units. The inner cylinder and air space acts as the dielectric. When the probe of FIG. 2A is wet, much higher capacitance exists between the outer plate surfaces, especially near their edges.

For a single point liquid level probe, these segments are made relatively short parallel to the axis of the whole assembly. A practical minimum distance is likely about one half of the probe's diameter. A multi-point probe may be made by placing multiple sets of plates at various positions along the probe's length.

To minimize lead capacitance, the electronics for each set of plates may be located nearby or within the probe, yet at a sufficient distance from the space enclosed by the plates 6 to keep the chip and its metallization from adding to the capacitance between the rear plate surfaces.

Figure 2B:
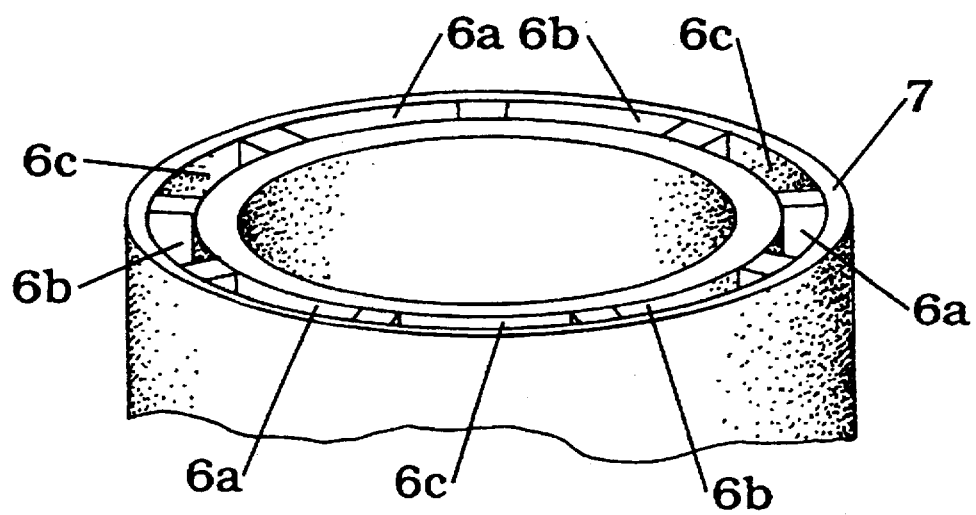
FIG. 2B shows a cylindrical sensing probe which has plate units which contain a plurality of electrically connected sensing plates.

FIG. 2B shows an arrangement wherein the plate units each comprise a set of three plates. The plate unit 6a is formed by three plates 6a which are electrically connected in parallel. Plate units 6b, 6c are also formed by multiple plates electrically connected in parallel. The plate units are insulated from one another in the same manner as the segments shown in FIG. 2A. Using a plurality of plates in each plate unit increases the total number of gaps between plates. Since it is near these gaps that most of the displacement currents flow, this increases the sensitivity.

While FIG. 2B shows the plate unit 6a containing three individual plates, any number of plates from one to any greater number(odd or even) may be utilized. However, the three different plate units 6a, 6b, 6c preferably will all have the same number of plates for each plate unit. Increasing the number of plates for each plate unit also increases the sensitivity and detection ability of the apparatus. While FIG. 2B shows every third plate is a member of the same plate unit, any odd number of plate units will function properly with respect to the apparatus disclosed. The plate units are also disposed symmetrically in an ordered arrangement as shown in FIG. 2B.

Figure 3:
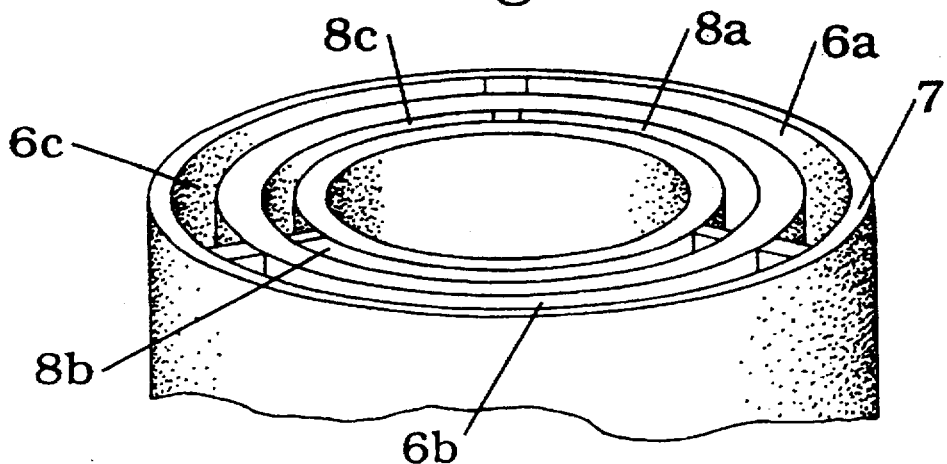
FIG. 3 comprises a second sensing probe having a second set of plates for shielding the outer sensing plates.

Alternatively, a second set of plate units 8a could be placed inside the first set of plate units 6a, 6b, 6c as shown in FIG. 3. Each inner plate unit 8a, 8b, 8c may have the same length and angular extent as a corresponding outer plate unit but a smaller radius. The inner plate unit 8a may be driven by a fast, high-input-impedance unity-gain voltage follower, taking its input from the corresponding outer plate unit 6a. This would shield or guard the plate unit from the effects of the others, making the effective capacitance between the rear surfaces of the plate units almost zero. Plate units 8b, 8c are operated in a similar fashion.

Figure 4:
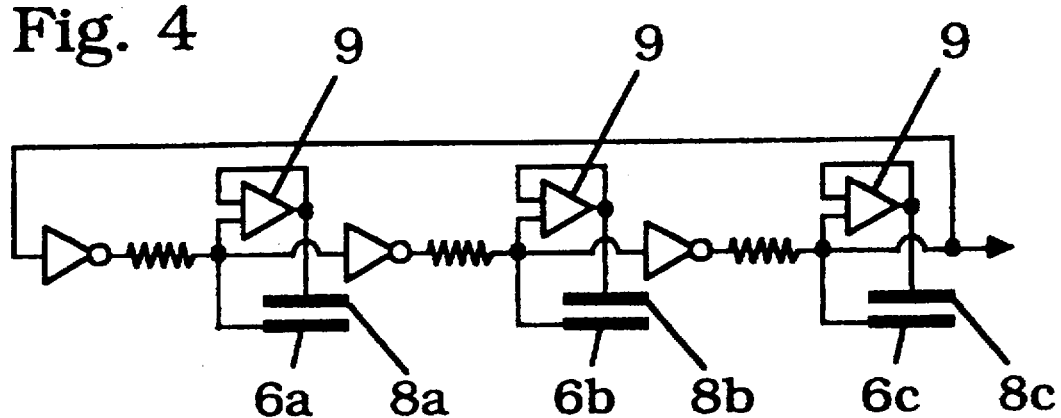
FIG. 4 shows a ring oscillator circuit for the apparatus of FIG. 3.

FIG. 4 shows this circuit arrangement wherein the unity gain follower or operational amplifier 9 drives the inner plate unit 8a. This arrangement protects outer plate unit 6a from any effects from the other outer plate units. Inner plate units 8b, 8c and outer plate unit 6b, 6c operate in a similar fashion. The output from each oscillator in FIG. 4 may be brought out directly in digital compatible frequency form or converted to another form, such as an analog voltage or a simple on-off signal to control the flow of liquid. Further, both digital and analog display devices may be used to signal the presence or absence of a liquid.

Continuous liquid depth indications may be accomplished by making a single set of plates extend vertically over the full length of desired measurement while occupying the same angular extent. Greater or lesser immersion of this section of the probe in liquid would give greater or lesser capacitance and therefore a lower or higher output frequency.

If the dielectric constant of the liquid is known, a useable depth reading is easily obtained. The capacitance per unit length, including the outer sheath of the probe may be calculated and a curve of depth versus output may be prepared. Similarly, if the liquid's dielectric constant is unknown, but is known to be much higher than that of the sheath or outer layer, the sheath dominates. The overall capacitance is measured by the equation which follows: $1/C_{overall} = 1/C_{sheath} + 1/C_{liquid}$. From this equation the capacitance per unit length may be approximated and a calibration curve prepared. The same is true where the liquid is electrically conductive due to the presence of dissolved mobile ions.

The dielectric constant of a vacuum is $8.849 \times 10^{-12}$ Farads per meter, commonly represented by $\epsilon_0$. The dielectric constant of any material may be regarded as the product of $\epsilon_0$ with a relative product $\epsilon_r$. Values of $\epsilon_r$ are tabulated for a great many different materials including solids in the table which follows.

| Material | $\epsilon_r$ |
| --- | --- |
| Air | 1.0006 |
| Distilled Water | 80 |
| Ethyl alcohol | 25 |
| Glycerin | 40 |
| Hexane | 1.89 |
| Benzene | 2.28 |
| Pyrex Glass | 4.65(typical) |
| Polyethylene | 2.26 |
| Polystyrene | 2.53 |
| Polyvinyl chloride (PVC) | 4.55 |
| "Neoprene" | 6.60 |
| "Nylon" | 3.75 |
| "Teflon" | 2.10 |

Dielectric values shown above are typical at audio frequencies. Some materials, such as PVC, have much lower values at frequencies of 1 megahertz or higher. By a fortunate coincidence, water not only has the highest value of $\epsilon_r$ for any common material, but it also comprises the chief component of most industrial, environmental and biological liquids including beverages. The dielectric constant of water is more than an order of magnitude higher than that of any commonly used, nonconducting solid. Therefore a continuous liquid level or depth probe may be made merely by sheathing or forming an outer layer with reasonably thick, low dielectric constant material. This outer layer may comprise fluorinated and preferably perfluorinated plastic material, and more preferably tetrafluoroethylene (TFE) polymer. For instance, heat-shrink tubing of polyvinyl chloride (PVC) or "Teflon" (which is a form of tetrafluoroethylene) would function properly depending on the expected temperature and chemical properties of the liquid to be sensed. PVC would serve well in the detection of inorganics including water and most aqueous solutions. An outer layer of tetrafluoroethylene will detect organics, inorganics and almost any other medium.

Figure 5:
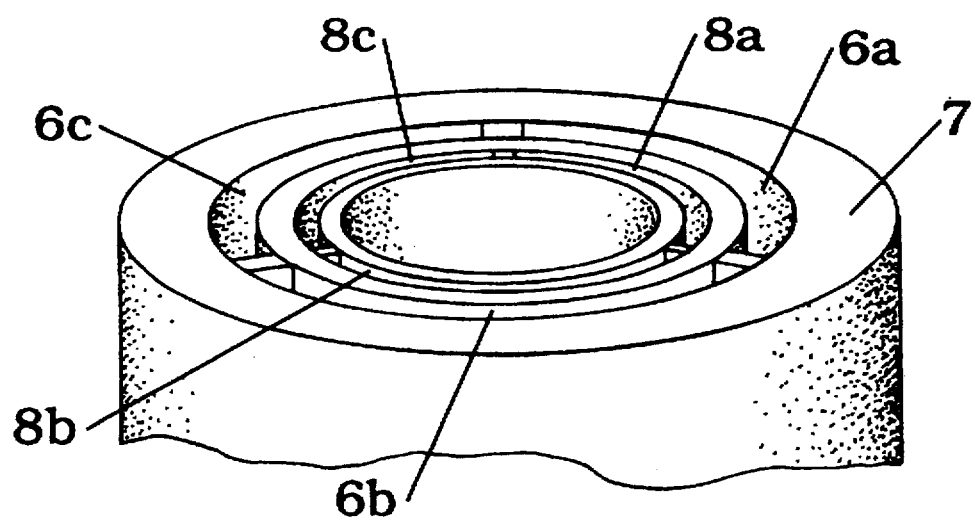
FIG. 5 shows a cylindrical sensing probe having a thick external sheath or layer.

For low dielectric constant liquids such as hexane and other hydrocarbons, or for powdered solids, a different approach may be utilized. As shown in FIG. 5, an external sheath or layer of low dielectric constant may be used, the thickness being such that the dielectric constant of the sheath dominates the external capacitance when the contribution from the liquid or powder is small. "Teflon" or another perfluorinated hydrocarbon polymer is an ideal material for this purpose. To minimize interference from the probe's internal capacitance, an inner set of unity gain amplifier driven plate units is needed as shown earlier in FIGS. 3 and 4. The sensed capacitance and oscillating frequency are strongly dependent on the external capacitance of the liquid or powder acting through the thick sheath. This is the case despite the fact that this capacitance is low. Relatively high value resistors are needed in the oscillator stages to help compensate for the low capacitance.

Figure 6:
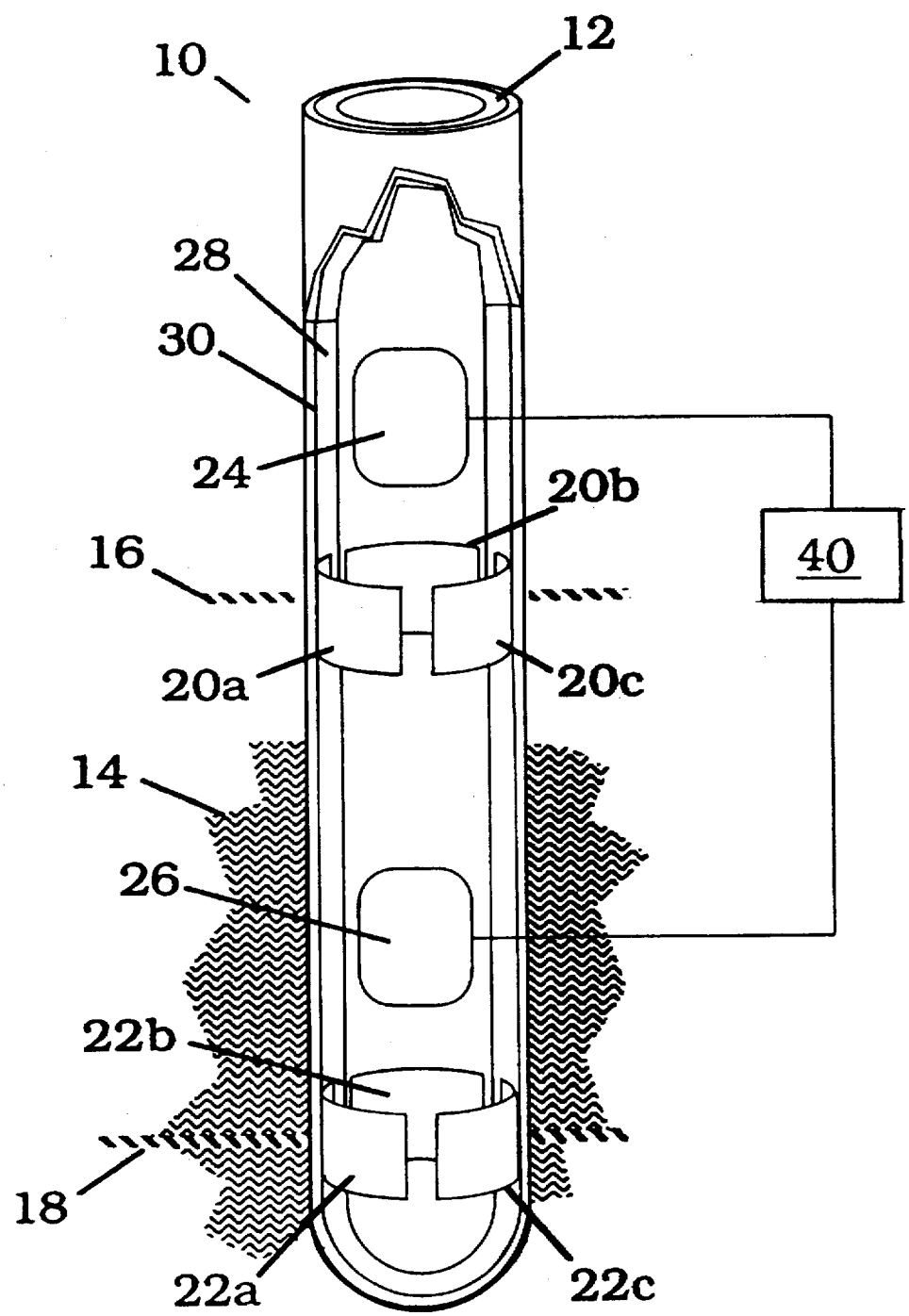
FIG. 6 shows a two point liquid level sensing probe.

Another embodiment 10 of the invention is shown in FIG. 6. The apparatus consists of a simple, on-off, two point liquid level probe 12 equipped for use in a high dielectric constant liquid 14, such as an aqueous solution. Such a probe may, for instance, be used to control the liquid level in a tank by turning on a pump when liquid rises above the upper sensing level 16 and turning the pump off again when the liquid falls below the second lower sensing level 18. Further, the probe may open or close a valve or place another control device 40 in a first or second state, for example on or off, depending upon the liquid level which is detected.

Sensing is accomplished by two groups of three plates 20a, 20b and 20c at level 16 and 22a, 22b, and 22c at sensing level 18. The plates are driven by ring oscillator electronics located in modules 24 and 26 respectively. The modules 24, 26 are located in the inner channel of the probe 12 and connected to the plates and the outside control device 40 by wires (not shown). Modules 24, 26 are shown separately, but also may be formed as a single unit. Output signals from modules 24, 26 take the form of a variable frequency square wave pulse train. These signals may be converted to other signal forms, if desired, using analog or digital signal processing elements. Rigid inner cylinder 28 may support all components of the probe. Outer layer or sheath 30 protects the electronics and plates from direct contact with the liquid to be sensed. The bottom of the probe is closed, of course, to seal in the noncondensable gas contained within the hollow cylindrical probe.

A final embodiment of the invention is shown in FIG. 7. The apparatus comprises a probe 52 for continuously measuring the depth or level of a high dielectric constant liquid 54, such as an aqueous solution. The apparatus is identical with the embodiment shown in FIG. 6, except that only one set of plates 56a, 56b and 56c is utilized along with a single electronics module 62. The plates extend from upper sensing level 58 to lower sensing level 60. The output consists of a square wave pulse train whose frequency decreases with rising liquid level. The electrical circuitry may be modified by means of analog or digital circuitry to change the output into any desired format.

Further, each of the sensing plates described earlier in the embodiments of FIGS. 1E, 6 and 7 may be replaced by a plate unit which may comprise a plurality of plates connected electrically in parallel and symmetrically spaced with respect to each other as shown in FIG. 2B. The parallel connected plates of the plate unit function in a manner similar to the sensing plate unit formed by a single plate. However, the sensing plate unit with multiple sensing plates enhances the sensitivity and vertical resolution of the apparatus. While FIG. 2B shows only three plates for each of three plate units, each plate unit may be formed by one, two or a greater number of plates. Further, while all of the drawings show three plate units per sensor, any odd number of plates units may be utilized.

It will be apparent to one having ordinary skill in the art that many changes and modifications may be made to the foregoing description of the preferred embodiments without departing from the spirit and scope of the invention, as defined by the appended claims.

What is claimed:

1. A liquid level sensing apparatus, said apparatus comprising:
    a housing;
    said housing containing an odd number of sensing plate units, said sensing plate units being greater in number than two;
    said sensing plate units being symmetrically spaced and each said plate unit occupying substantially the same portion of the housing's circumference;
    insulating gaps between said plate units;
    said plate units being enclosed by a layer of nonconducting material which forms an outer cover for said housing such that said plate units do not contact the liquid to be sensed;
    a lower part of said housing being closed and sealed to prevent the entry of said liquid into said housing and between said sensing plate units;
    said sensing plate units being electrically connected to an electrical circuit; and
    said electrical circuit providing an output signal responsive to the presence of said liquid.

2. The liquid level sensing apparatus of claim 1, wherein said housing comprises a substantially cylindrical shape.

3. The liquid level sensing apparatus of claim 1, wherein each of said odd number of sensing plate units comprises three sensing plates electrically connected in parallel.

4. The liquid level sensing apparatus of claim 1, wherein said layer of nonconducting material comprises perfluorinated plastic material.

5. The liquid level sensing apparatus of claim 1, wherein said apparatus comprises a second electrical circuit and a second set of said odd number of sensing plate units connected to said second electrical circuit, said second set of plate units being spaced below said first set of odd number sensing plate units and equal in number to said first set of odd number of sensing plate units;
    said second set of said sensing plate units being symmetrically spaced and each said plate unit occupying substantially the same portion of the housing's circumference;
    and said second electrical circuit being substantially identical to the electrical circuit of said first set of sensing plate units.

6. The liquid level sensing apparatus of claim 5, wherein said second set of sensing plate units and said second electrical circuit with a second output signal form a two point liquid level sensor with said first set of sensing plate units and said first output signal;
    a control device being operated in a first state when said second set of sensing plate units indicates the absence of said liquid;
    said control device being operated in a second state when said first set of sensing plate units indicates the presence of said liquid.

7. The liquid level sensing apparatus of claim 1, wherein the apparatus includes a set of shielding plates insulated from each other and equal in number to said odd number of sensing plate units;
    said shielding plates being disposed within the housing symmetrically with respect to each other and radially inward of, and in alignment with said odd number of sensing plate units.

8. The liquid level sensing apparatus of claim 7, wherein the shielding plates are individually connected to said electrical circuit via individual unity gain followers.

9. The liquid level sensing apparatus of claim 7, wherein said shielding plates together form a cylindrical shape within said housing.

10. The liquid level sensing apparatus of claim 1, wherein said electrical circuit is contained within said housing.

11. The liquid level sensing apparatus of claim 1, wherein said electrical circuit has no reference ground.

12. The liquid level sensing apparatus of claim 1, wherein an interior of said housing contains a dry noncondensable gas disposed radially inward from said sensing plate units.

13. A liquid level sensing apparatus, said apparatus comprising:
    a substantially cylindrical housing;
    said housing containing an odd number of sensing pates, said sensing plates being greater in number than two;
    said sensing plates being symmetrically spaced and each said plate taking up the same portion of the housing's circumference;
    insulating gaps between said plates;
    said plates being covered by a layer of nonconducting material which forms an outer cover for said housing;
    said plates being electrically connected to an electrical circuit;
    said electrical circuit comprising at least three inverters, each said inverter driving a series resistor and one of said plates;
    said at least three inverters, being connected in series and forming said circuit;
    a frequency of said electrical circuit being inversely proportional to the capacitance of said odd number of plates;
    said electrical circuit frequency decreasing in response to increases in capacitance due to the presence of a liquid.

14. The liquid level sensing apparatus of claim 13, a lower part of said housing being closed and sealed to prevent entry of said liquid into said housing between said sensing plates.

15. The liquid level sensing apparatus of claim 13, wherein said layer of nonconducting material comprises perfluorinated plastic material.

16. The liquid level sensing apparatus of claim 13, wherein said electrical circuit has no reference ground.

17. A liquid level sensing apparatus, said apparatus comprising:

a substantially cylindrical housing;

said housing containing an odd number of sensing plates, said sensing plates being greater in number than two;

said sensing plates being symmetrically spaced and each said plate occupying substantially the same portion of the housing's circumference, said sensing plates together forming a substantially cylindrical shape;

said plates being enclosed by a layer of nonconducting perflourinated plastic material which forms an outer cover for said housing such that said sensing plates do not contact a liquid to be sensed;

a lower part of said housing being closed and sealed to prevent the entry of said liquid into said housing and between said sensing plates;

said sensing plates being electrically connected to an electrical circuit; and said electrical circuit providing an output signal with a frequency which decreases in response to increases in capacitance due to the presence of said liquid.

18. The apparatus of claim 17, wherein said perfluorinated plastic material further comprises a tetrafluoroethylene polymer.

19. The apparatus of claim 17, wherein an interior of said housing contains a dry noncondensable gas disposed radially inward from said sensing plates.

20. The apparatus of claim 17, wherein said electrical circuit has no reference ground.

* * * * *